UNITED STATES PATENT OFFICE.

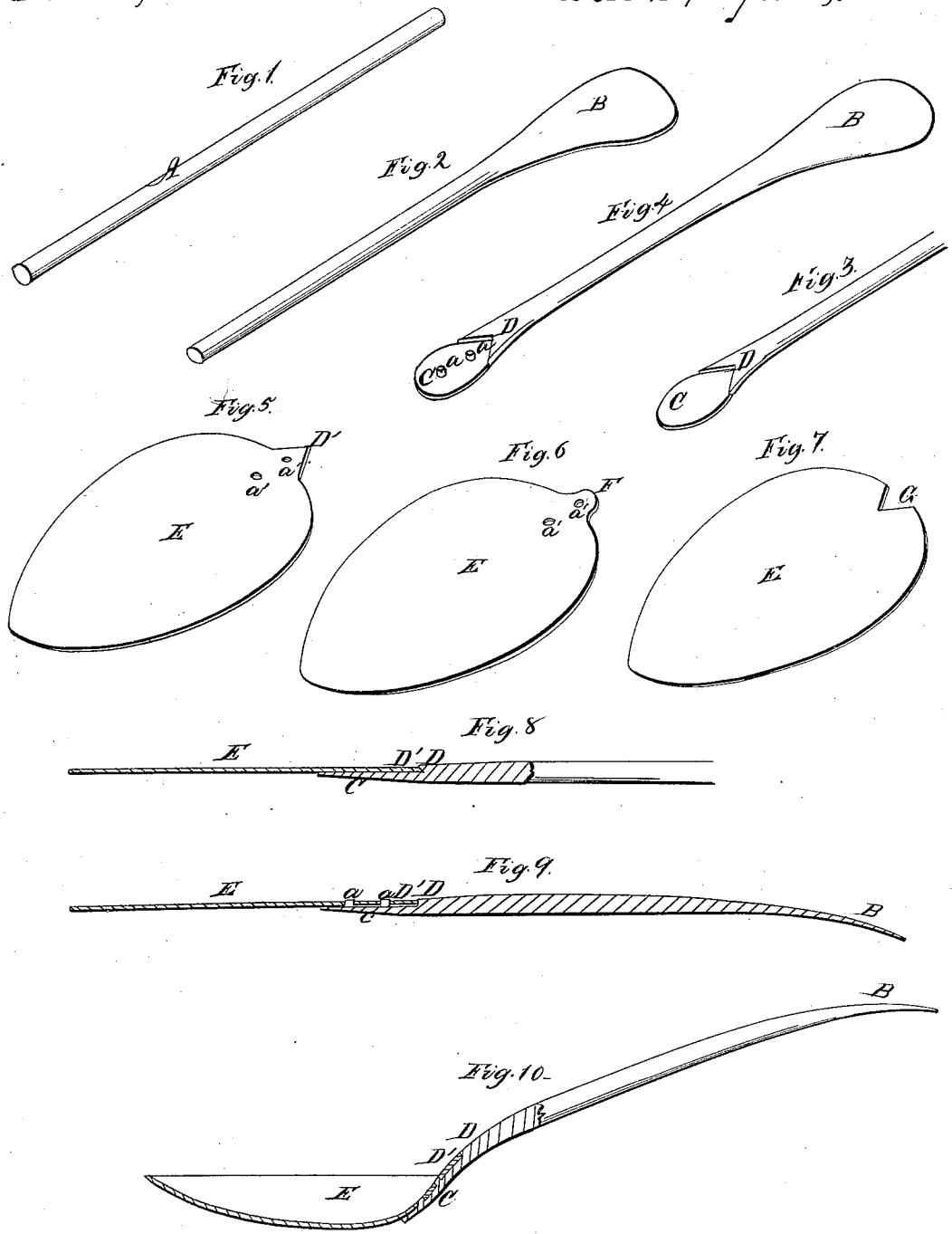

G. I. MIX, OF WALLINGFORD, CONNECTICUT.

IRON SPOON.

Specification of Letters Patent No. 25,518, dated September 20, 1859.

*To all whom it may concern:*

Be it known that I, G. I. MIX, of Wallingford, in the county of New Haven and State of Connecticut, have invented a new and useful Improvement in Iron Spoons; and I do hereby declare that the following is a full, clear, and exact description of the same, reference being had to the annexed drawings, making a part of this specification, in which—

Figure 1, is a perspective view of the round wire of which the handle is composed. Fig. 2, perspective view of the handle after being flattened at the upper end. Fig. 3, perspective of the handle with its lower end flattened and prepared to receive the bowl, without the use of rivets. Fig. 4, perspective of the handle completed and ready to receive the bowl and the parts to be fastened with rivets. Fig. 5, perspective of the bowl blank, as it appears when cut out ready for attachment to the handle. Figs. 6 and 7, modifications of the same. Fig. 8, sectional view of handle and bowl blank laid together for union without rivets. Fig. 9, sectional view of handle and bowl blank, laid together for union with rivets. Fig. 10, sectional view of handle and bowl completely united and finished.

Similar letters of reference indicate the same parts in all the figures.

My invention consists, first, in a new method of making the handle; second, in a new method of combining the bowl and handle.

For a great variety of culinary and other purposes the use of spoons composed of a hard metal-like iron, is absolutely necessary. The cheapness of this material and its extreme durability renders it the most desirable of all the metals, next to gold and silver, for the purpose indicated. But, no method has ever been devised of manufacturing iron spoons with a sufficient cheapness and nicety of finish to enable them to be brought into competition with the low priced spoons composed of the softer alloyed metals.

The common method of making the handles of iron spoons is by forging them out, by hand, from a bar of iron, upon the anvil. This is a very slow, tedious and expensive method. The handles when finished present a clumsy, uncouth, appearance. They bear the imprint, or indentation, of the hammer in all their parts; they are unequal in size; their surface is rough both to the touch and sight; they are strong in some parts and weak in others, owing to the greater or less weight of the hammering blows.

My improved method of forming the handle remedies all these defects. Instead of forging out the handle from bar iron I cut of a suitable length of wire (A Fig. 1,) of the proper diameter, and after heating, place the same in a drop press of the common kind, having dies corresponding to the form of the desired spoon handle. By one blow of this press the upper portion B, of the handle is flattened and fashioned into the shape shown in Fig. 2, and is at the same time left in a smooth and finished condition.

I find in practice that a single workman can make spoon handles by my method, during the time required for making handles of the same size, by the common plan of forging. My method also effects an important saving of iron, for none is lost by scaling, as there is when forged.

All handles made by my plan are smooth and of uniform strength and size throughout. The next step is to form the lower part of the handle for the reception of the bowl blank. For this purpose the handle is put in another drop press, having a different set of dies, and by a single blow, the lower end is flattened and fashioned into the peculiar form seen in Fig. 4; the flat portion C, having one or more rivets (*a, a,*) which are struck up, by the blow of the press; a short distance up the handle, a V-shaped recess or inlet D, is formed (by the same blow) in which the corresponding extremity of the bowl blank rests.

The striking up of the rivets upon the lower part of the handle I do not here claim as I have already received Letters Patent for that feature. Nor do I claim, generally, the use of drop presses in spoon making. The next step is to unite the bowl blank and handle. The bowl blank E is cut out in the usual form, except that at its upper end it is provided with a V-shaped projection or tongue D′, see Fig. 5. This tongue D′, fits the corresponding recess or inlet D, in the handle. Holes, *a′, a′*, to receive the rivets *a, a,* are made in the blank E. Thus prepared the bowl E, and handle are placed together, the rivets upon the handle passing through the holes in the bowl blank, and the tongue D′ fitting into the recess or inlet D, the upper surfaces of the blank and of the handle being flush or level when united. A slight tap with a hammer serves to combine the handle and bowl temporarily; and then they are placed in a drop press, when, by one blow, the riveting is finished, the bowl blank struck into the required dish shape, and a graceful curve imparted to the whole article, as shown in Fig. 10. All that now remains to be done is to dip the spoon in a bath of melted tin, which gives the article a polished, bright exterior; the tin also finds its way into and fills up the crevices if any are left, between the handle and bowl, and adds some strength to the union by acting as a partial solder. If a finer article is required I plate the spoon with silver or gold by the galvanic process. A splendid article is thus produced which rivals, in appearance, spoons made of the softer alloys, and far surpasses them in durability and strength.

If desired the edges of the recess or inlet D, (see Fig. 3,) may be made shelving or beveled inward, and the tongue upon the bowl blank D′, may have an outward bevel. When thus made and put together the edge of the recess D, will overlap the edge of D′ (see Fig. 8) and the parts when brazed and struck together by the drop press will be firmly and handsomely united.

Instead of the V-shaped projection the upper end of the bowl blank may have a rounded termination as shown at F, in Fig. 6. In this case the recess or cavity upon the handle must be made of a rounded form corresponding to the said termination.

Another modification of my improvement would be to have a V-shaped inlet or recess upon the bowl blank (as shown at G Fig. 7) and a corresponding V-shaped projection upon the handle. But I prefer to have the projection or tongue upon the bowl blank and the recess upon the handle.

The object of the tongue D′, and recess D, is to afford greater strength to the spoon at the points of union between the handle and bowl. When the spoon is bent vertically the tongue also bends and prevents any opening of the joint. When the spoon is bent laterally the sides of the inlet or recess D, prevent the projection D′, from moving out of place or of wiggling or becoming loose. Thus the spoon will remain rigid and strong at the points of union, even though subjected to severe usage.

Having thus described by invention what I claim as new and desire to secure by Letters Patent, is,

Forming a tongue D′, upon the bowl blank, and a corresponding recess or inlet D, upon the handle, or vice versa, substantially as and for the purposes herein set forth.

G. I. MIX.

Witnesses:
    EBENEZER H. IVES,
    C. C. FOOTER.